United States Patent [19]

Hirakoso et al.

[11] Patent Number: 5,025,623
[45] Date of Patent: Jun. 25, 1991

[54] ROCKET ENGINE

[75] Inventors: Hiroyuki Hirakoso; Teruyuki Aoki, both of Nagoya, Japan

[73] Assignee: Mitsubishi Jukogyo Kabushiki Kaisha, Tokyo, Japan

[21] Appl. No.: 392,283

[22] Filed: Aug. 11, 1989

[30] Foreign Application Priority Data

Sep. 13, 1988 [JP] Japan ................. 63-227596

[51] Int. Cl.$^5$ ............................... F02K 9/42
[52] U.S. Cl. ........................ 60/257; 60/267
[58] Field of Search ........... 60/257, 260, 267, 728, 60/730, 270.1; 62/29, 30, 48.2

[56] References Cited

U.S. PATENT DOCUMENTS

| | | | |
|---|---|---|---|
| 2,960,834 | 11/1960 | Kirk Patrick | 60/257 |
| 3,002,340 | 10/1961 | Landerman | 60/260 |
| 3,040,520 | 6/1962 | Rae | 60/260 |
| 3,410,092 | 11/1968 | Goldstein | 60/257 |
| 3,557,557 | 1/1971 | Prachar | 60/257 |
| 3,561,217 | 2/1971 | Hall | 60/260 |
| 3,756,024 | 9/1973 | Gay | 60/257 |
| 3,775,977 | 12/1973 | Builder et al. | 60/267 |
| 4,754,601 | 7/1988 | Minovitch | 60/257 |
| 4,771,601 | 9/1988 | Spies | 60/260 |
| 4,782,655 | 11/1988 | Weber | 60/260 |
| 4,893,471 | 1/1990 | Huling | 60/257 |

OTHER PUBLICATIONS

Aviation Week and Space Technology, Nov. 6, 1961, p. 59, *Liquid Air Cycle Engines for High-Speed Aircraft*.
Journal of the British Interplanetary Society, 1963–64, vol. 19, pp. 484–490, *Lace Concept Feasibility Proof Sought*.

*Primary Examiner*—Louis J. Casaregola
*Attorney, Agent, or Firm*—Wenderoth, Lind & Ponack

[57] ABSTRACT

Known air intake type rocket engines of the type in which air is condensed and liquefied by employing a propelling agent, loaded on the rocket, as a coolant, and in which the liquefied air is utilized as an oxidizing agent or working fluid, are improved according to the present invention in that air remaining uncondensed is compressed and then condensed and liquefield by employing the liquefied air as a coolant.

20 Claims, 6 Drawing Sheets

ROCKET ENGINE

BACKGROUND OF THE INVENTION

1. Field of the Invention

The present invention relates to an engine that is favorable for use in an airplane, a flying body, a space shuttle or a space rocket, wherein liquid hydrogen is used as fuel and oxygen in air is used as an oxidizing agent while it is being liquefied.

2. Description of the Prior Art

A space rocket must carry an oxidizing agent for burning fuel in addition to the fuel, because normally it flies through a cosmic space where no air is present. Rockets of recent years which make use of liquid hydrogen as fuel and liquid oxygen as an oxidizing agent are practically useful.

However, in practicality, the amount of fuel and oxidizing agent required (fuel and oxidizing agent will hereinafter be referred to collectively as "propelling agent") is such that they occupy the largest part of the weight and volume of the main body of the rocket. As a result, the weight of a payload, such as human bodies and artificial satellites, is limited. If the weight of such payload is increased, it will be necessary to correspondingly increase the amount of propelling agent carried. This will, in turn, necessitate reinforcement of the rocket structure in proportion to the increase of the weight of the payload and the propelling agent. In addition, it is necessary to provide more propelling agent for launching the added weight of the payload, the propelling agent and the reinforcement structure members. Thus, increasing the weight of the payload results in an enormous expense.

In light of these problems, the inventors of the present invention have previously invented a lightweight engine having an excellent oxygen liquefying efficiency and which can efficiently utilize oxygen in the atmosphere as an oxidizing agent at least during flight in the atmosphere, in order to cut or reduce the weight of the oxidizing agent. This invention is set forth in Japanese Patent Application No. Sho 59 (1984)-180759, and will now be explained with reference to FIGS. 5 and 6.

Figure 5:
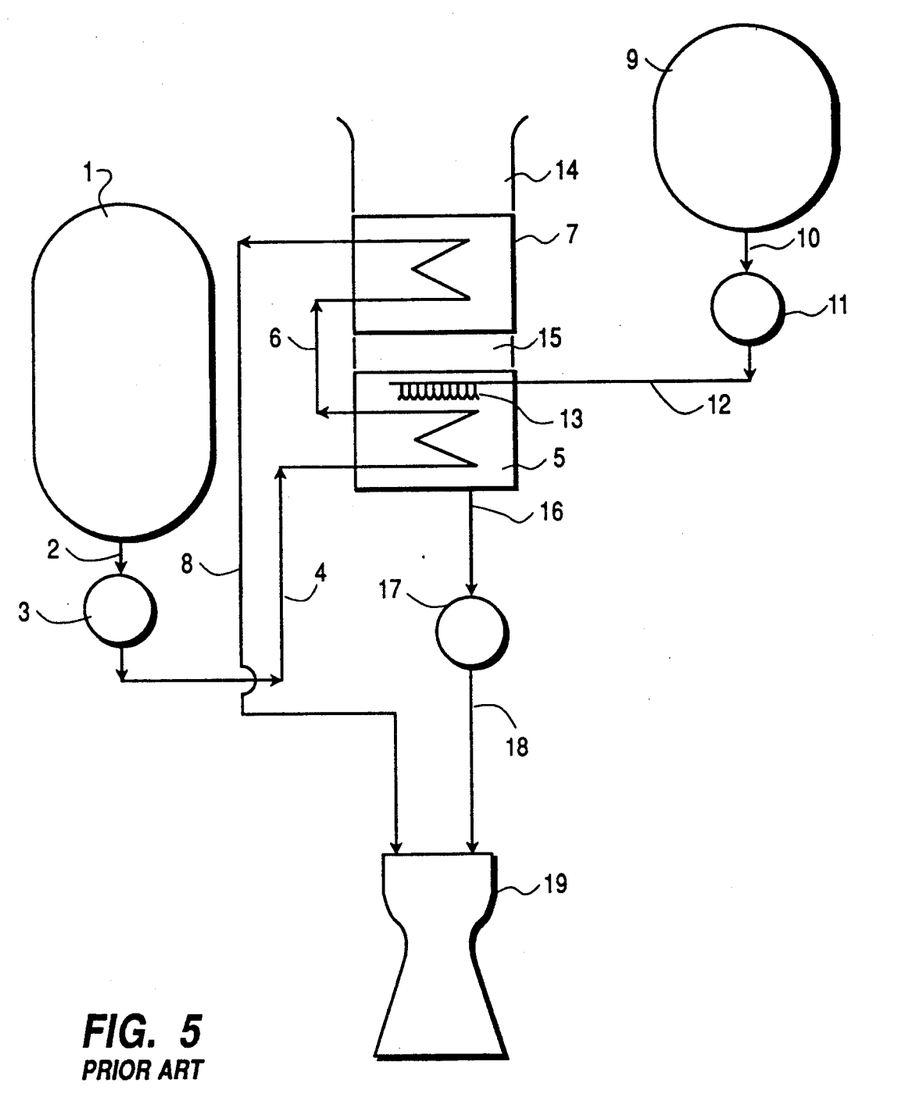
FIGS. 5 and 6 are schematic diagrams respectively showing examples of prior art rocket engines.

At first, as shown in FIG. 5, liquid hydrogen at a temperature in the proximity of its triple point (about 14° K.) stored in a liquid hydrogen tank 1 is pressurized by means of a pump 3 and is fed into an air condensor 5. The air condensor 5 is a heat-exchanger composed of flat plates or finned tubes and condenses and liquefies air by making use of a coolant consisting of low-temperature hydrogen.

In the air condensor 5, the liquid hydrogen has its temperature raised by being exposed to the condensation heat of air, and is then fed into an air precooler 7. The air precooler 7 is provided to preliminarily cool the air introduced through an air duct 14 to about 90° K. for the purpose of enhancing the air liquefying efficiency of the air condensor.

It is to be noted that since the liquefying temperature and the efficiency for liquefying air will change depending upon the pressure thereof, in the case where the rocket operates high up in the air at a high speed, the pressures in the air precooler 7 and the air condenser 5 should be raised appropriately by means of a ram pressure device or the like.

Liquid hydrogen having come out of the air precooler 7 is led through a pipe 8 to a combustor 19 of the rocket engine.

On the other hand, liquid oxygen at a temperature in the proximity of its triple point (about 55° K.) stored in a liquid oxygen tank 9 is pressurized by means of a pump 11 and is led into a head portion of the air condenser 5. The liquid oxygen in the air condensor 5 is then sprayed in a shower-like manner into an air flow within an air duct 15 by means of a sprayer 13 so as to liquefy the air.

The condensed and liquefied air in the condensor 5 (the air having been liquefied by the coolants consisting of hydrogen and liquid oxygen) is mixed with the sprayed liquid oxygen, and after being pressurized by a pump 17, is fed to the combustor 19 of the rocket engine.

In the combustor 19, combustion is effected by the mixed fluid consisting of the fed liquid hydrogen, the liquefied air and the liquid oxygen. In this manner, high-temperature combustion gas is ejected through a nozzle and a propelling force is generated.

As described above, in the rocket engine shown in FIG. 5, the amount of liquefaction of the air is increased by spraying the low temperature liquid oxygen coolant from the sprayer 13, thereby raising the liquefying temperature due to the increase in the oxygen concentration of the air. Accordingly, the propelling force of the rocket engine is improved.

Figure 6:
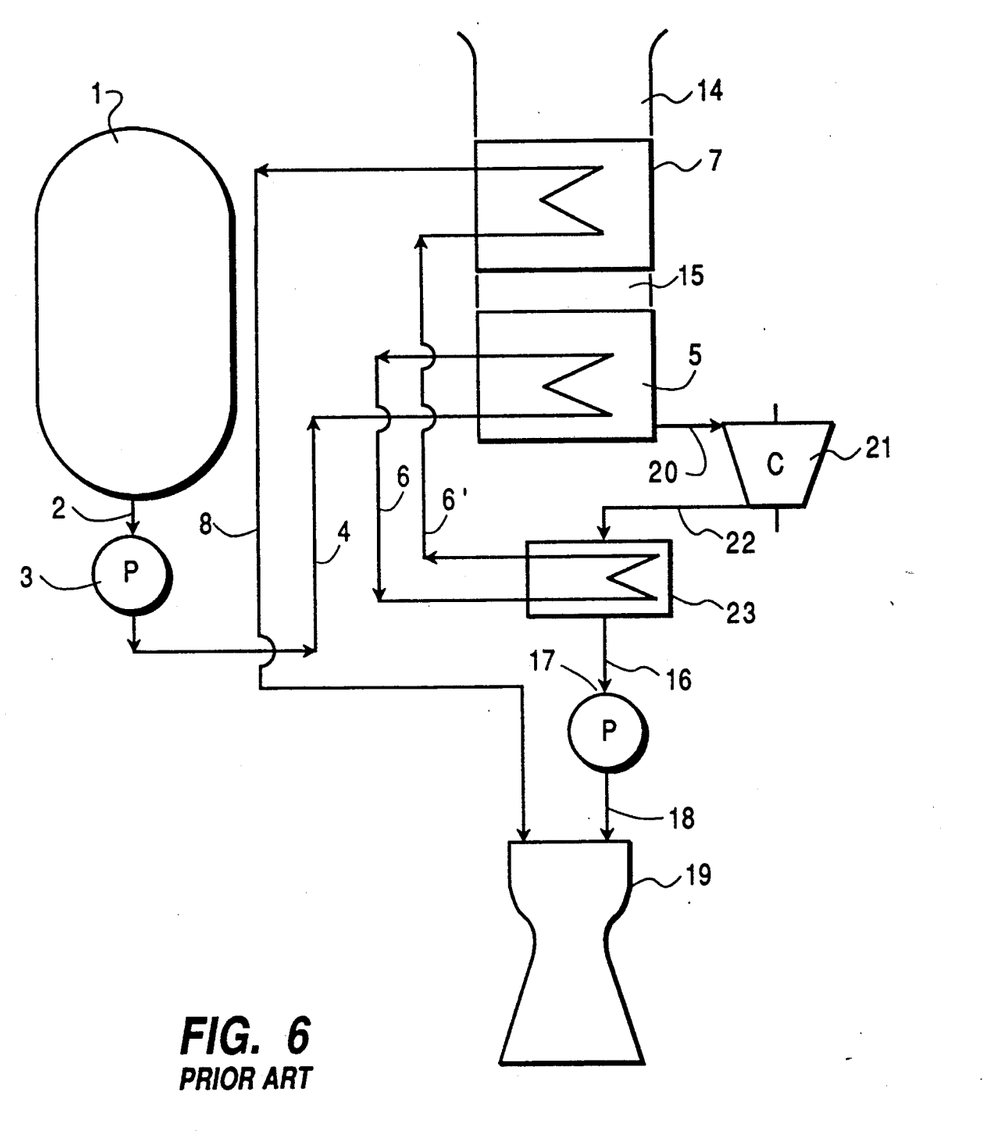

In an example of the prior art shown in FIG. 6, the construction is similar to that shown in FIG. 5, except that an axial flow type or centrifugal type air compressor 21 is added downstream of the air flow in the air condensor 5, and an auxiliary air condensor 23 is added downstream of the air compressor 21. This auxiliary air condensor 23 is cooled by hydrogen having a temperature of about 80° K. fed from the air condensor 5.

In this example of the prior art, any remaining gaseous air (i.e. that which has not been liquefied in the air condensor 5) is compressed by the air compressor 21 to raise its pressure. Such compressed air is then led into the auxiliary air condensor 23.

The liquefying temperature (boiling point) of air will, of course, rise in accordance with a rise in pressure. In the engine shown in FIG. 6, since there are provided the air compressor 21 and the auxiliary condensor 23, the pressure of the air will rise. As a result, the liquefying temperature will increase and the amount of latent heat of liquefaction will decrease, thereby causing the amount of liquefaction to increase.

In addition, in FIGS. 5 and 6, reference numerals 2, 4, 6 and 6' designate liquid hydrogen pipes, numerals 10 and 12 designate liquid oxygen pipes, numerals 16 and 18 designate liquid air pipes, and numerals 20 and 22 designate air pipes.

In an air liquefaction cycle engine which employs the oxygen in air as an oxidizing agent while it is liquefying the air, the performance is determined by the magnitude of the amount of liquefied air produced by an air liquefier. Accordingly, an air liquefaction cycle engine can be improved by increasing the amount of liquefied air produced. In the prior art rocket engines shown in FIGS. 5 and 6, only liquid oxygen and liquid hydrogen are relied upon as coolants for air liquefaction. Since the amount of liquid oxygen and liquid hydrogen is finite, the amount of liquefied air is correspondingly limited.

SUMMARY OF THE INVENTION

It is therefore one object of the present invention to provide an improved air liquefaction cycle engine in which the amount of liquefied air is increased as compared to such type of engines in the prior art.

According to one feature of the present invention, there is provided an air intake type rocket engine wherein air is condensed and liquefied by employing a propelling agent loaded on the rocket as a coolant, wherein the liquefied air is utilized as an oxidizing agent or a working fluid, and wherein any remaining uncondensed air is compressed and condensed to liquefy it by employing the liquefied air as a coolant.

According to the present invention, owing to the above-featured construction of the rocket engine, liquefaction of air is carried out by using the liquefied air which is produced in the rocket engine as a coolant so as to increase the amount of liquefied air produced. The liquefied air produced in the prior art rocket engines was not utilized as a coolant.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENT

Figure 1:
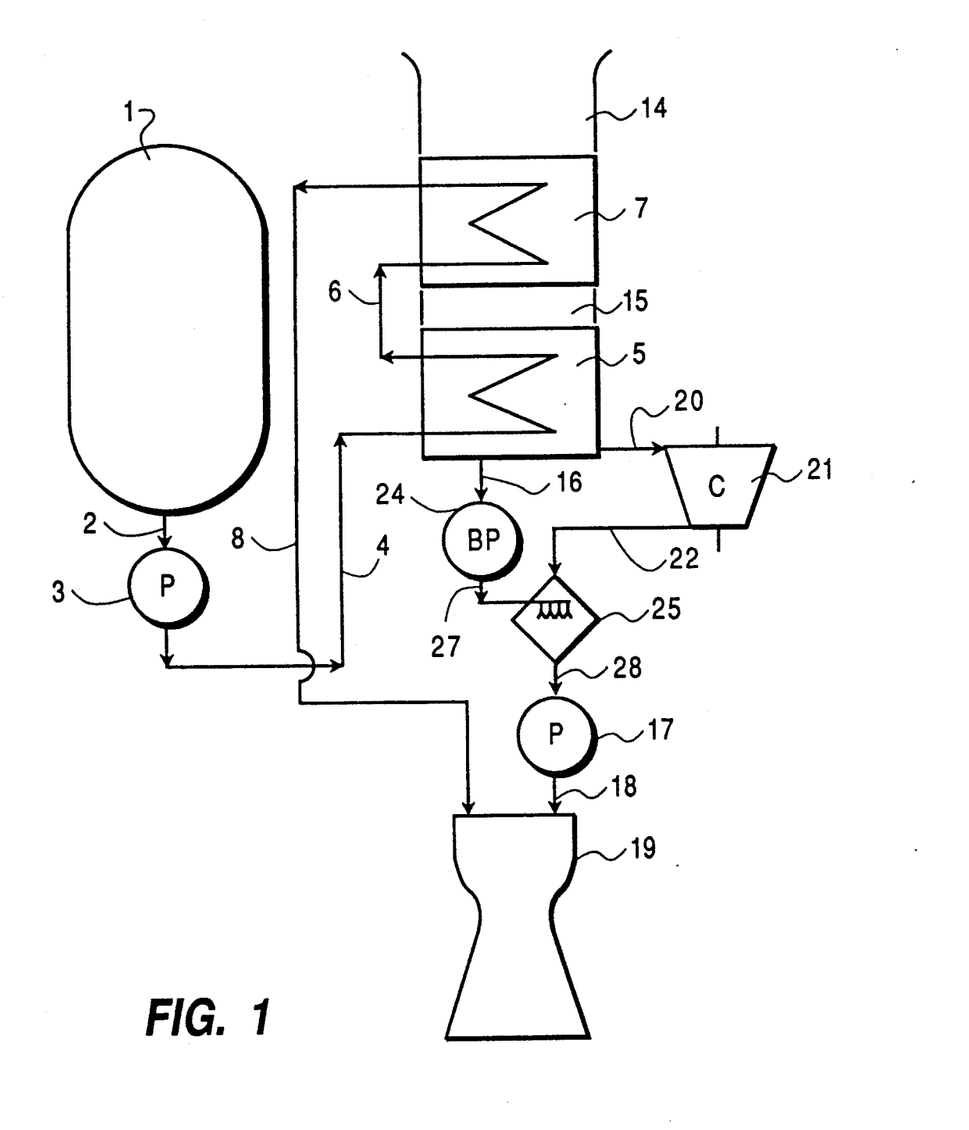
FIGS. 1, 2, 3 and 4 are schematic diagrams respectively showing first, second, third and fourth preferred embodiments of the present invention.

Referring now to FIG. 1 which shows a first preferred embodiment of the present invention, liquid hydrogen stored within a liquid hydrogen tank 1 is pressurized by means of a pump 3, then led into an air condensor 5 through a pipe 4, and further led into a rocket engine combustor 19 through a pipe 6, an air precooler 7 and a pipe 8. Air passes from an air duct 14 through the air precooler 7, an air duct 15 and the air condensor 5, such that a part of the air is liquefied. The liquefied air enters a boost pump 24 through a pipe 16, and is pressurized by the boost pump 24 and sprayed into a mixer or mixing chamber 25 via a pipe 27. The remaining air not liquefied in the air condensor 5 enters an air compressor 21 via a pipe 20 where it is compressed to several atmospheric pressures. The compressed air then enters via a pipe 22 into the mixer 25, where it is mixed with the liquefied air fed from the boost pump 24 and is liquefied by the coolant which consists of liquefied air. The liquefied air enters via a pipe 28 into a pump 17, where it is pressurized and fed into the rocket engine combustor 19 via pipe 18. In the combustor 19 the liquefied air is mixed with hydrogen and burnt.

The air in the mixer 25 has a raised liquefying temperature because its pressure is higher than the air within the air condensor 5. As a result, the air liquefying temperature of the air fed from the compressor to the mixer 25 is several tens of degrees higher than the temperature of the liquefied air fed from the boost pump 24. Accordingly, the liquefied air fed from the boost pump 24 can be utilized as a coolant for liquefying the air in the mixer 25.

Figure 2:
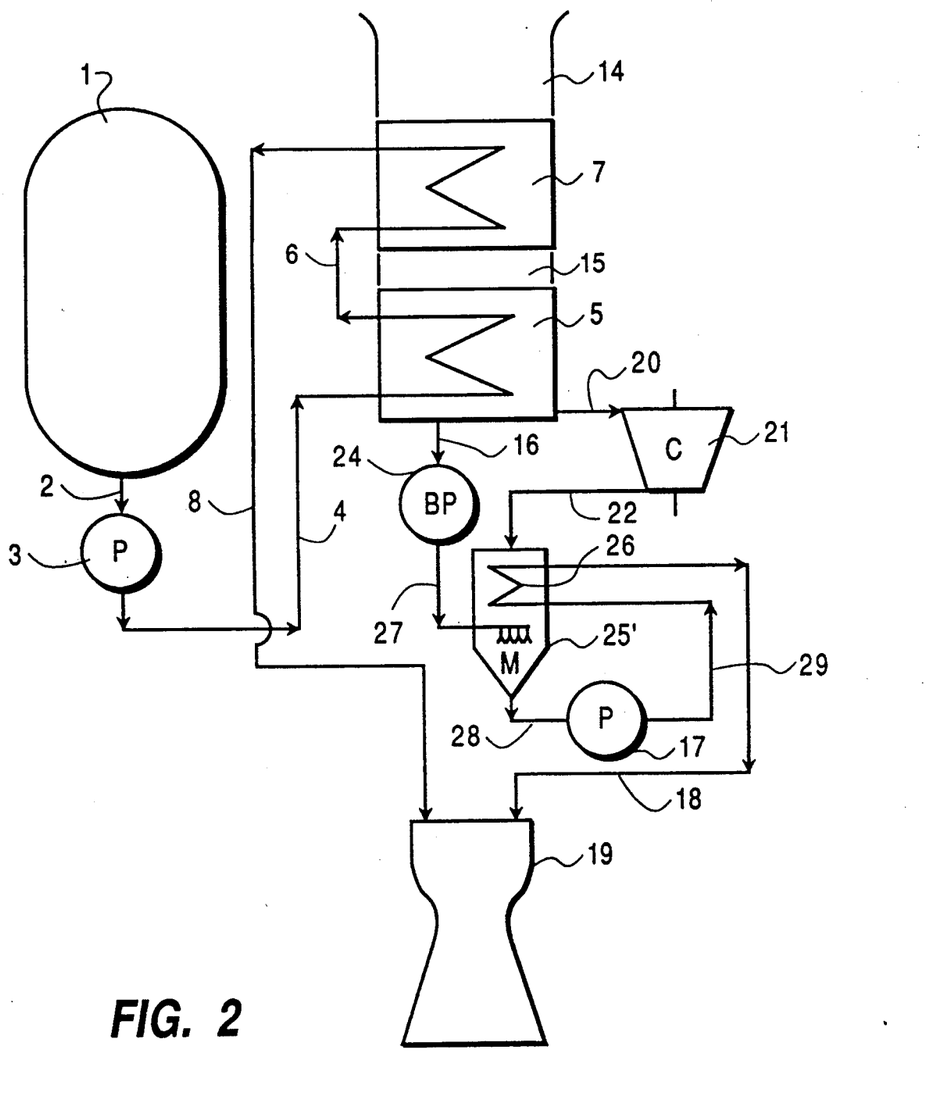

A second preferred embodiment of the present invention is shown in a schematic diagram in FIG. 2. This preferred embodiment is almost the same in principle as the above-described first preferred embodiment. The only difference resides in the mixer 25'. The mixer 25' in this second preferred embodiment is associated with a heat-exchanger 26 which utilizes the liquefied air from the mixer as a refrigerant (or coolant). The air liquefied in the mixer 25' is introduced via a pipe 29 into the heat-exchanger 26 by a pump 17. After it has effected heat-exchange with the air compressed by air compressor 21, it is fed to the rocket engine combustor 19. In this way, the temperature of the air which has been compressed by the air compressor 21 and heated up, is preliminarily lowered by the heat-exchanger 26. In this second preferred embodiment, due to its use in the heat-exchanger 26, the coolant consisting of liquefied air fed from the boost pump 24 can be used to absorb the latent heat of liquefication of the air within the mixer 25'. Therefore, the amount of liquefaction can be further increased.

Figure 3:
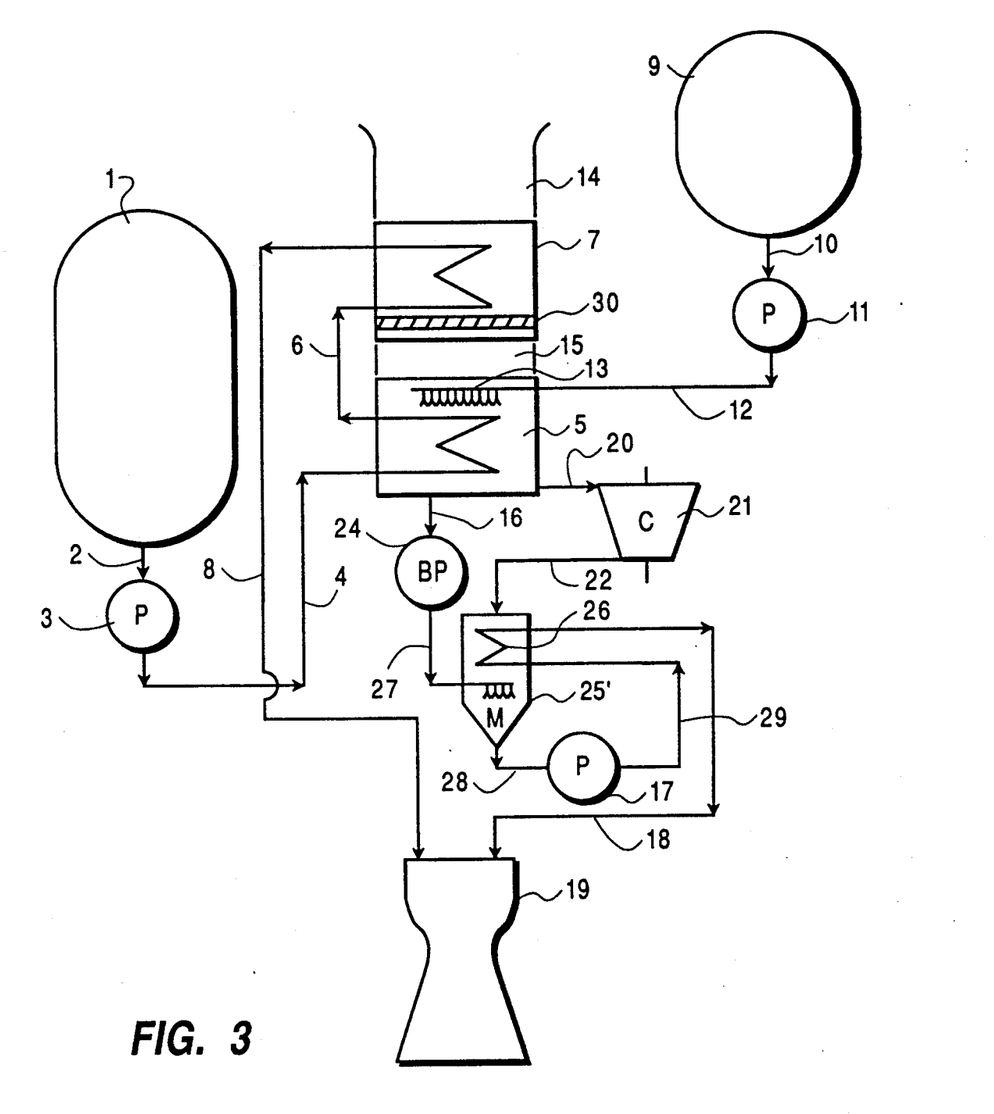

A third preferred embodiment of the present invention is shown in a schematic diagram in FIG. 3. This preferred embodiment is similar to the embodiment in FIG. 2, except that its air precooler 7 has associated therewith a defrosting means 30, and except that its air condensor 5 has associated therewith a sprayer 13 for spraying liquid oxygen thereinto. The defrosting means can be a defroster which mechanically vibrates the air precooler (e.g. a hammer or a vibrator), or a defroster which blows high-pressure fluid. The inclusion of the defrosting means 30 can prevent moisture and/or carbon dioxide contained in the air from adhering to heat-exchange surfaces, thereby increasing the heat transfer efficiency. In addition, the liquid oxygen sprayer 13 sprays liquid oxygen into the air condensor 5 after it has been fed from a liquid oxygen tank 9, fed through a pipe 10, and pressurized by a pump 11. In this manner, the liquid oxygen acts as a refrigerant for liquefying air, and is subsequently burnt in the combustor 19 as an oxidizing agent for oxidizing the liquid hydrogen so as to increase the propelling force of the engine.

Figure 4:
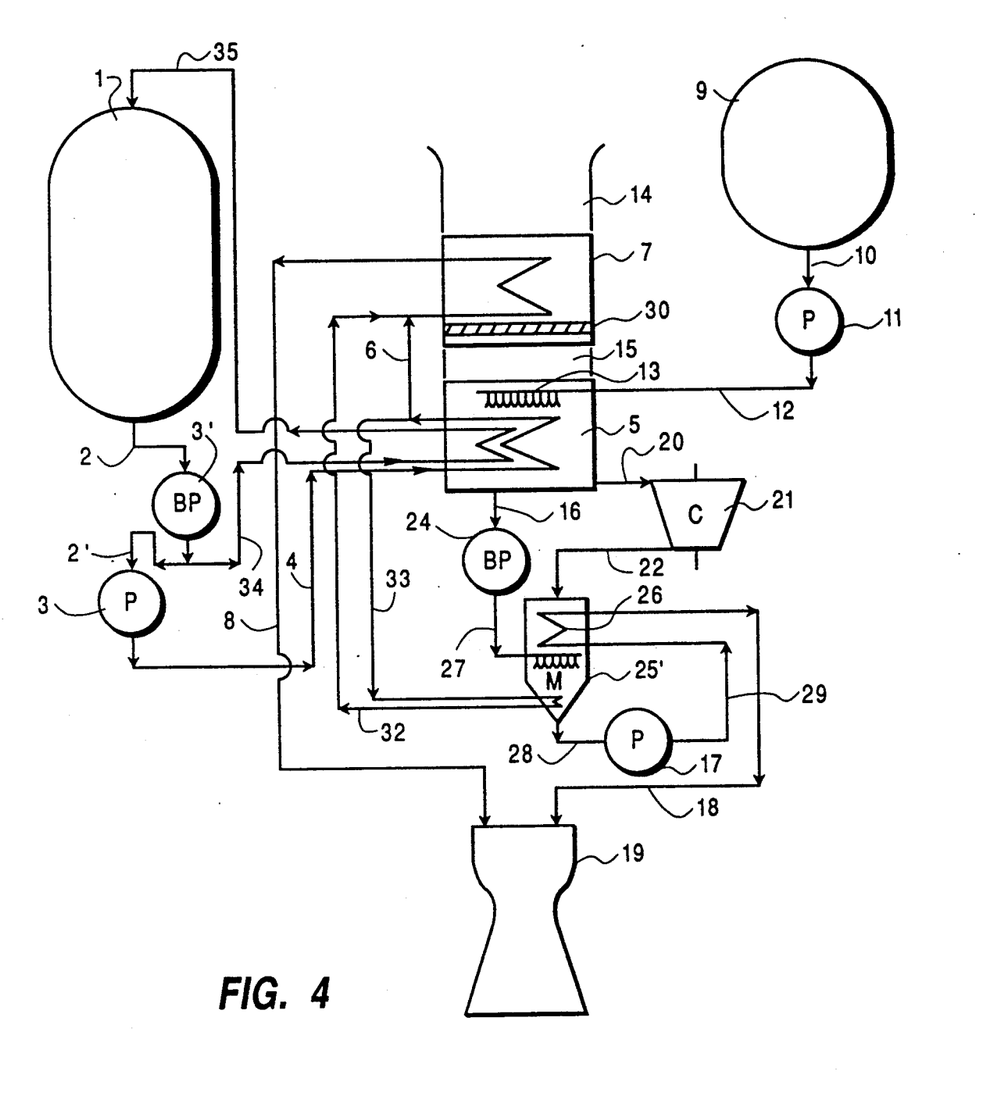

A fourth preferred embodiment of the present invention is shown in a schematic diagram in FIG. 4. This preferred embodiment differs from the above-described third preferred embodiment in the following manner. The liquid hydrogen stored within the liquid hydrogen tank 1 is pressurized by a boost pump 3'. The pipe leading away from the boost pump 3' is branched into a first pipe 34 and a second pipe 2'. The first pipe 34 leads part of the liquid hydrogen into the air condensor 5 where it acts as a coolant. After the liquid hydrogen has cooled air in the air condensor 5, it is returned to the liquid hydrogen tank 1 through a pipe 35. The second pipe 2' leads part of the liquid hydrogen into the air condensor 5 via a pump 3 and a pipe 4. After the liquid hydrogen in pipe 4 has cooled air in the air condensor 5, some of it is fed through a pipe 6 and some of it is fed through a pipe 33. The pipe 6 leads liquid hydrogen through the air precooler 7 to the rocket engine combustor 19 in a similar manner to the above-described third preferred embodiment. The pipe 33, on the other hand, leads liquid hydrogen into a mixer 25'', in which it performs heat-exchange with air to insure liquefaction of the air. Liquid hydrogen exhaust from the mixer 25'', passes through a pipe 32, and joins with the liquid hydrogen in the pipe 6, and as described above, is fed to the rocket engine combustor 19 through the air precooler 7. It is to be noted that flow regulating valves (not shown) are disposed in the above-described pipes 6 and 33, so that flow rates of liquid hydrogen distributed to the pipes 6 and 33 can be respectively regulated.

In this fourth preferred embodiment, the boost pump 3' is provided so as to compensate for a line pressure loss of liquid hydrogen, a part of the liquid hydrogen pressurized by the boost pump 3' is returned to the liquid hydrogen tank 1 after it has cooled air in the air condensor 5, and latent heat of fusion of liquid/solid hydrogen and sensible heat of liquid hydrogen are utilized for cooling and liquefaction of air in the air condensor 5. In addition, the remaining liquid hydrogen is fed to the mixer 25" after it has passed through the air condensor 5, to thereby improve the liquefaction of the air.

As a result of the above-described constructions and operations, according to the present invention, it is possible to increase the amount of liquefied air by 15% (when the flying speed is zero) to 40% (when the flying speed is Mach 3) as compared to the prior art rocket engines. Additionally, the specific propelling force (performance) of an air liquefaction cycle engine which uses oxygen in the air as an oxidizing agent while liquefying the oxygen can be improved.

While the principles of the present invention have been described above in connection with a number of preferred embodiments of the invention, it is a matter of course that many apparently widely different embodiments of the invention can be made without departing from the spirit and scope of the present invention.

We claim:

1. A liquefied air cycle engine comprising:
   an air intake duct for receiving air;
   condensor means for condensing at least a portion of the air into liquefied air;
   coolant supply means for supplying coolant to said condensor means;
   a mixing chamber;
   spray means for spraying the liquefied air into said mixing chamber;
   pump means for pumping the liquefied air from said condensor means to said spray means;
   compressor means for compressing any unliquefied air remaining in said condensor;
   means for feeding air from said compressor means to said mixing chamber to mix with the liquefied air sprayed into said mixing chamber such that the air from said compressor means becomes liquefied;
   means for feeding air from said mixing chamber; and
   combustor means for combusting liquefied air fed from said mixing chamber.

2. A liquefied air cycle engine as recited in claim 1, wherein
   said coolant supply means supplies liquid hydrogen to said condensor means.

3. A liquefied air cycle engine as recited in claim 2, further comprising
   means for feeding the liquid hydrogen from said condensor means to said combustor means.

4. A liquefied air cycle engine as recited in claim 1, further comprising
   air pre-cooling means for cooling the air prior to its entry into said condensor means.

5. A liquefied air cycle engine as recited in claim 4, further comprising
   means for feeding the coolant to said pre-cooling means.

6. A liquefied air cycle engine as recited in claim 4, wherein
   said coolant supply means supplies the coolant to said condensor means and then to said pre-cooling means.

7. A liquefied air cycle engine as recited in claim 1, further comprising
   heat exchanger means for cooling the air from said compressor means prior to the air from said compressor means mixing with the liquefied air sprayed into said mixing chamber by said spray means.

8. A liquefied air cycle engine as recited in claim 7, further comprising
   means for feeding liquefied air from said mixing chamber to said heat exchanger means prior to the air from said mixing chamber being fed to said combustor means.

9. A liquefied air cycle engine as recited in claim 7, further comprising
   liquid oxygen supply means for supplying liquid oxygen to said condensor means.

10. A liquefied air cycle engine as recited in claim 9, wherein
    said liquid oxygen supply means comprises means for spraying said liquid oxygen into said heat exchanger to mix with the air.

11. A liquefied air cycle engine as recited in claim 9, further comprising
    air pre-cooling means for cooling the air prior to its entry into said condensor means; and
    defroster means for defrosting said pre-cooling means.

12. A liquefied air cycle engine as recited in claim 9, further comprising
    a booster pump, said coolant supply means being operable to supply the coolant to said booster pump; and
    means for feeding a portion of the coolant from said booster pump directly to said condensor means and then back to said coolant supply means.

13. A liquefied air cycle engine as recited in claim 12, further comprising
    a primary pump; and
    means for feeding a remainder of the coolant from the booster pump to said primary pump and then to said condensor means.

14. A liquefied air cycle engine as recited in claim 13, further comprising
    means for feeding a portion of the coolant from said primary pump, after being fed through said condensor means, to said mixing chamber to further cool the liquefied air.

15. A liquefied air cycle engine as recited in claim 1, further comprising
    liquid oxygen supply means for supplying liquid oxygen to said condensor means.

16. A liquefied air cycle engine as recited in claim 15, wherein
    said liquid oxygen supply means comprises means for spraying said liquid oxygen into a heat exchanger to mix with the air.

17. A liquefied air cycle engine as recited in claim 1, further comprising
    air pre-cooling means for cooling the air prior to its entry into said condensor means; and
    defroster means for defrosting said pre-cooling means.

18. A liquefied air cycle engine as recited in claim 1, further comprising
a booster pump, said coolant supply means being operable to supply the coolant to said booster pump; and
means for feeding a portion of the coolant from said booster pump directly to said condensor means and then back to said coolant supply means.

19. A liquefied air cycle engine as recited in claim 18, further comprising
a primary pump; and
means for feeding a remainder of the coolant from the booster pump to said primary pump and then to said condensor means.

20. A liquefied air cycle engine as recited in claim 19, further comprising
means for feeding a portion of the coolant from said primary pump, after being fed through said condensor means, to said mixing chamber to further cool the liquefied air.

* * * * *